(No Model.) 2 Sheets—Sheet 1.

R. A. STEELE.
IMPLEMENT FOR DEHORNING CATTLE.

No. 438,959. Patented Oct. 21, 1890.

WITNESSES:
Fred G. Dieterich
M. D. Blondel

INVENTOR:
Robert A. Steele.
BY
ATTORNEYS

THE NORRIS PETERS CO., PHOTO-LITHO., WASHINGTON, D. C.

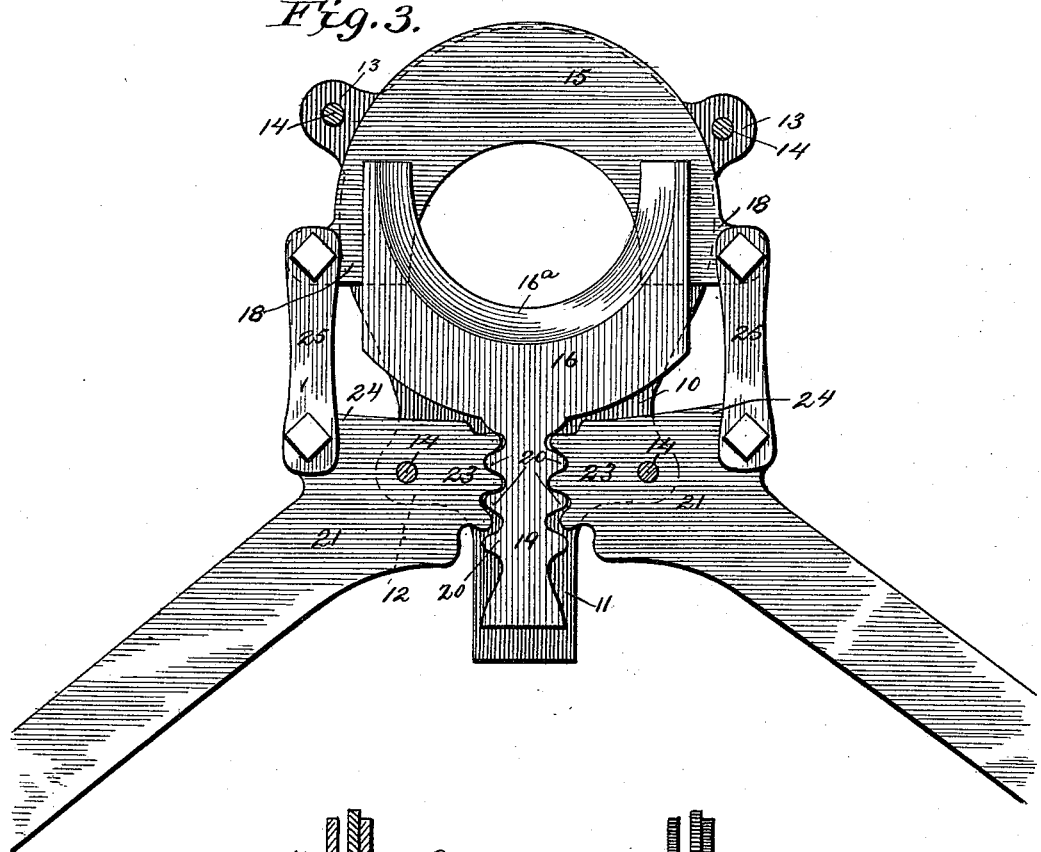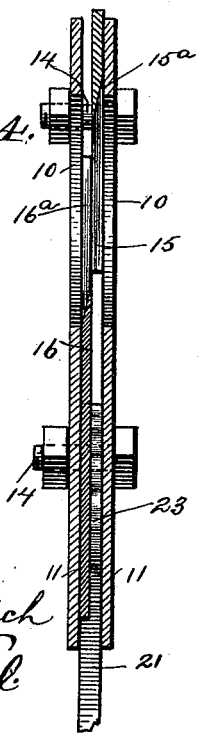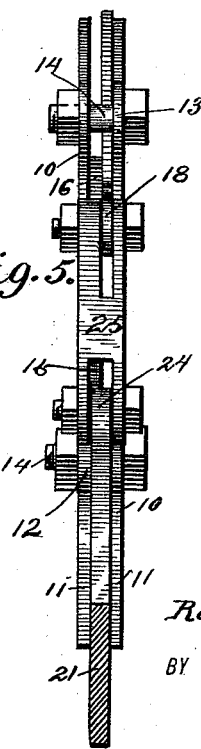

UNITED STATES PATENT OFFICE.

ROBERT A. STEELE, OF LAWRENCE, KANSAS.

IMPLEMENT FOR DEHORNING CATTLE.

SPECIFICATION forming part of Letters Patent No. 438,959, dated October 21, 1890.

Application filed August 15, 1890. Serial No. 362,123. (No model.)

*To all whom it may concern:*

Be it known that I, ROBERT A. STEELE, of Lawrence, in the county of Douglas and State of Kansas, have invented a new and useful Improvement in Implements for Dehorning Cattle, of which the following is a specification.

My invention relates generally to dehorning implements, and particularly to certain improvements upon the implement shown and described in Patent No. 406,208, granted to J. W. Fugate July 2, 1889. In the implement above referred to the pitmen or link-connections and extensions on the frame are quite long and often interfere with the dehorning operation either by catching the animal's ears or by striking against the stanchion. Furthermore, the pitmen are connected to the upper cutter above the shear of the cutter and the cut is of a pushing nature, which is not desirable.

The object of my invention is to remedy the above-mentioned defects; and with this end in view my invention consists in the peculiar construction of various parts and their novel combination or arrangement, as will be more fully described hereinafter, and then pointed out in the claims.

Figure 1:
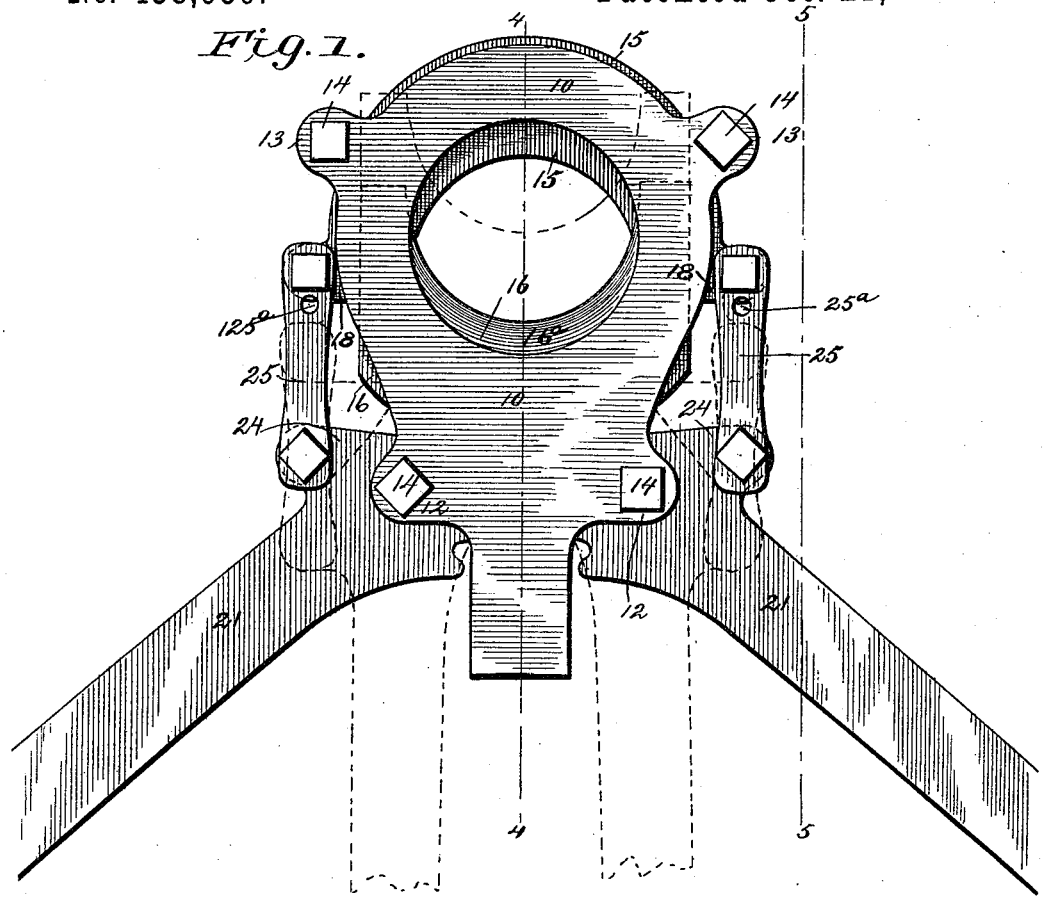
Figure 2:
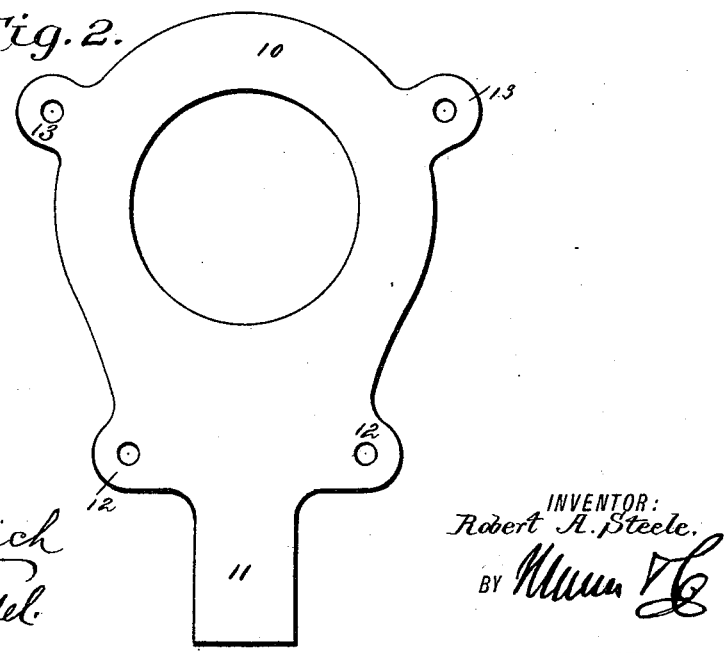

In the drawings forming a part of this specification, and in which the same numerals of reference indicate the same parts, Figure 1 is a side elevation of the implement, illustrating in positive lines the cutters as opened to receive the horn, and closed to sever the horn in dotted lines. Fig. 2 is a side elevation of a detached portion of the guiding-frame. Fig. 3 is a side elevation of the implement, one of the plates of the frame being removed. Fig. 4 is a central transverse section on the line 4 4 of Fig. 1, and Fig. 5 is a sectional view taken on line 5 5 of Fig. 1.

Throughout this specification I shall refer to portions adjacent to the operator when in use as "inner," and those remote as "outer," these terms being selected for clearness of description.

In carrying out my invention I employ a guiding-frame essentially circular in contour and consisting of two spaced rings 10, provided with a tongue or shank 11, projected inwardly from the peripheral edge of the center, and a lug 12 at each side of said tongue and adjacent thereto. The rings are also provided near their outer edges with the lugs 13, and the frame is formed by connecting the two opposed rings by bolts 14, passing through the lugs 12 and 13, one of said rings having smooth bolt-apertures and the other having threaded apertures. An inner cutter 16 is arranged between the plates of the guiding-frame, said cutter being, essentially, semicircular in shape, and at its inner edge is provided with an inwardly-projecting shank 19, which rests between the shanks 11 of the frame. The outer edge of the cutter 16 is beveled as at $16^a$. An outer cutter 15 is also arranged between the rings 10 and adapted to slide upon the inner cutter 16, said outer cutter being also, essentially, semicircular in shape, and has its inner edge beveled, as at $15^a$, in opposite direction to the bevel of $16^a$. The cutter-shank 19 is provided at each side with a series of teeth 20, and between each pair of opposing lugs 12 of the frame is pivoted a lever 21, the head of each lever having a curved toothed segment 23, adapted to engage the teeth of the shank 19. The levers extend inward a considerable distance and at their inner ends are provided with handles. (Not shown.) Thus by drawing the handles inward toward the operator the inner cutter is moved outward, and in order to move the outer cutter simultaneously the levers are each provided with arms 24, extending outward from their heads, which arms are pivotally connected with arms or lugs 18, integral with the inner end of the outer cutter, by means of the pitmen or links 25. The levers are of a thickness exactly equal to the combined thicknesses of the inner and outer cutter, and the lever is pivoted centrally in the link 25, while at the outer end of the link the arms or lugs 18 are pivoted to one side of the longitudinal center of the link 25, whereby the draft of the link will always be in direct line with the outer cutter, thus preventing wabbling of the outer cutter. The outer end of the link 25 is provided with a series of transverse apertures $25^a$, whereby the outer cutter may be adjusted as the beveled edge becomes worn by grinding or otherwise by simply moving the pivotal bolt into one of the inner holes. By this feature the implement will last much longer.

By connecting the link to the inner end of the outer cutter the power is applied directly in line with the shear, and a much cleaner cut is effected.

The arc of the circle in each cutting-surface of the cutters is such that when the two cutters are thrown their farthest distance apart the opposed cutting-edges will form, essentially, a complete circle, which circle is narrowed and made to approach an oval as the cutting-edges of the cutters are made to approach each other. The handles being thrown away from the operator and the cutters forced apart, the horn of the animal is introduced between the cutting-edges, and as the handles are drawn inward the toothed heads of the levers throw the inner cutter outward and the outer cutter is drawn simultaneously inward by means of the links 25 and arms 24, as shown in dotted lines in Fig. 1. Thus as the cutters move the same distance at the same time and in opposite directions they contact simultaneously with the horn, and as they are forced in or through the same they cut upon all sides, leaving the stump of the horn perfectly smooth and free from checks.

By my improvements herein shown and described the guiding-frame is rendered smaller and the outer cutter given more room for movement, the links are a great deal shorter, and are provided with means whereby the wear on the outer cutter can be compensated, and being pivoted at the inner end of the outer cutter the power is applied directly in line with the shear, and by means of the peculiar pivoting of the link to the lever and outer cutter the draft on the said cutter is always directly in line with the same. The levers being of a thickness equal to the combined cutters also aid in this last result.

In practice I prefer to make the shank of the cutter the same thickness as the levers. This will prevent uneven wear of the cog-teeth.

Having thus described my invention, what I claim as new is—

1. The combination, with a guiding-frame provided with a central opening, of an outer and inner cutter arranged in the frame and sliding upon each other within the frame, provided with opposed concaved cutting-edges, levers contacting with the inner cutter and operating the same, and an adjustable link or pitman connection between said levers and the outer cutter, all combined and adapted to operate substantially as shown and described.

2. In the improvement herein shown and described, the combination, with the frame and cutters, of the lever pivoted in the frame, and the links pivoted centrally to the levers and to the inner ends of the outer cutter upon one side of the longitudinal center of the link, substantially as shown and described.

3. In the improvement herein shown and described, the combination, with the guiding-frame, of the inner cutter and outer cutter, the lever contacting with and operating the inner cutter, said lever being of a thickness equal to the combined thicknesses of the cutter, and links centrally pivoted to the lever at their inner ends and to one side of the longitudinal center at their outer ends, the said outer ends being connected to the inner ends of the outer cutter and provided with a series of perforations, substantially as shown and described.

ROBERT A. STEELE.

Witnesses:
L. CURMANDER,
WILDER S. METCALF.